R. E. HELLMUND.
SYSTEM OF CONTROL.
APPLICATION FILED SEPT. 9, 1915.
1,246,424. Patented Nov. 13, 1917.
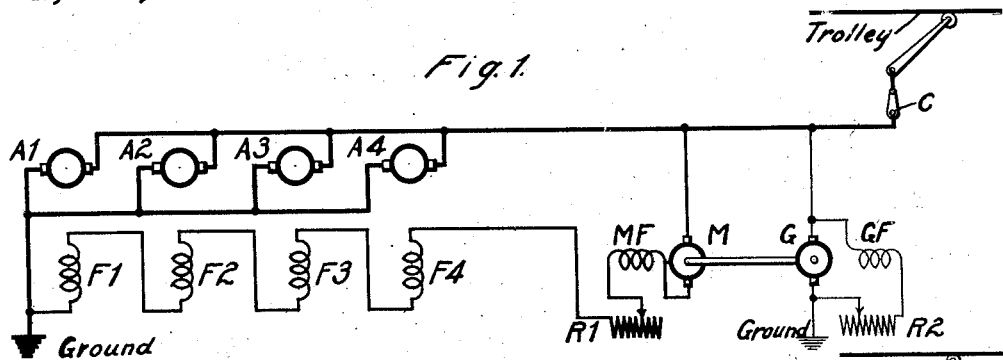
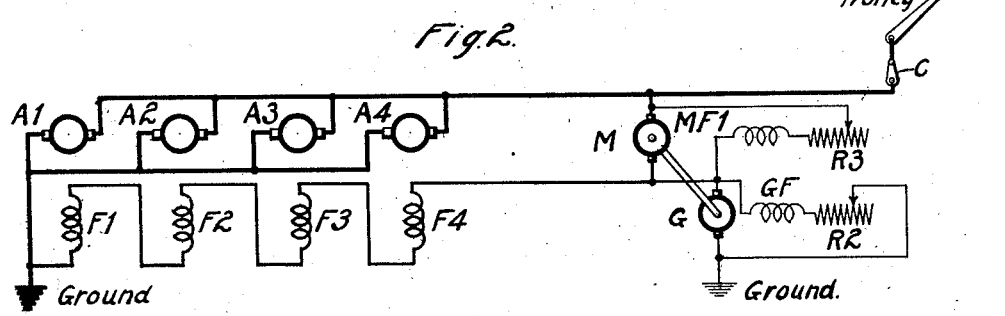
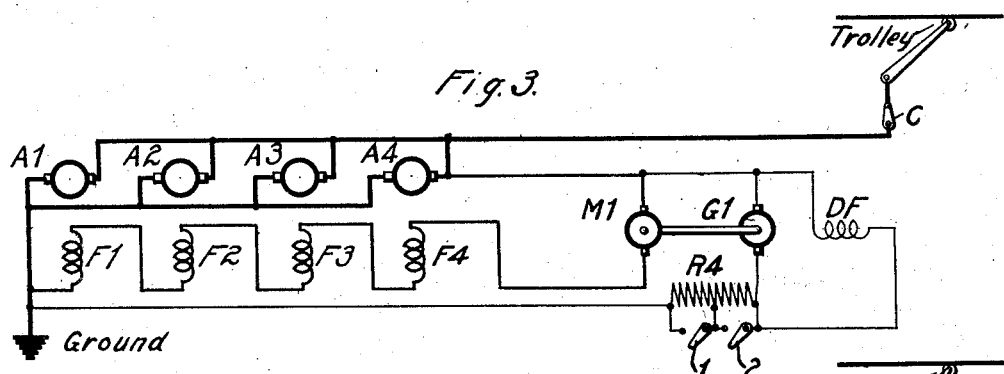
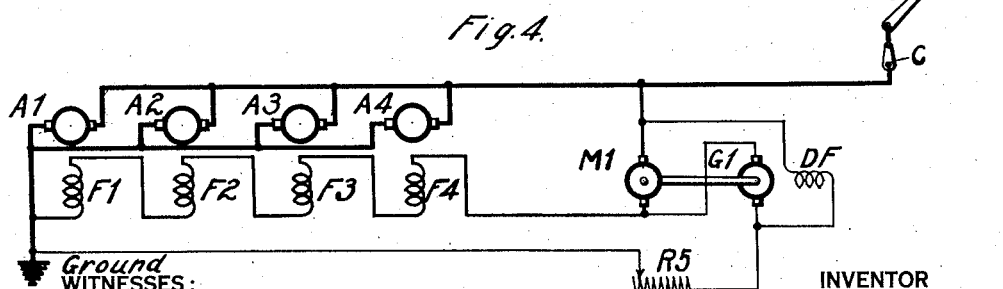
INVENTOR
Rudolf E. Hellmund.

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,246,424.

Specification of Letters Patent.  Patented Nov. 13, 1917.

Application filed September 9, 1915.  Serial No. 49,748.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control, and it has special reference to the regenerative control of electric railway vehicles and the like.

The object of my invention is to provide an effective and reliable system of the above-indicated character which shall be relatively economical in operation.

Heretofore, in many regenerative systems, a separate exciting means for the field windings of the main machines, such as a storage battery or motor-generator, has been required during the regenerating period, for the reason that a straight self-excited series generator is not stable or reliable in operation and also because the series-type field windings of electric railway motors are not well adapted for shunt excitation, inasmuch as such motors are usually operated as series motors during propulsion conditions, and the field windings are accordingly designed for relatively heavy currents and comprise relatively few turns. Consequently, a straight shunt excitation would be possible only by the addition of a special field winding for this purpose which, by reason of the space limitations prevailing with railway motors, particularly because of the crowded condition of the under surfaces of the floors of modern electric railway vehicles, is usually impractical.

According to my present invention, I provide means for permitting shunt excitation of a plurality of regenerating dynamo-electric machines without necessitating excessive losses in the exciting circuit and without requiring the use of any additional field windings or external source of energy.

For a better understanding of the nature of my present invention, reference may be had to the following description and the accompanying drawing in which Figure 1 is a schematic diagram of an electrical control system embodying a form of my invention; Fig. 2 is a similar diagram of a modified form of the system shown in Fig. 1; Figs. 3 and 4 are schematic diagrams of control systems embodying other forms of my invention in which dynamoters are substituted for the motor-generator sets of the systems illustrated in Figs. 1 and 2.

Referring to Figure 1, the system shown comprises a plurality of supply-circuit conductors respectively marked Trolley and Ground, a plurality of main dynamo-electric machines that are respectively provided with armatures $A^1$, $A^2$, $A^3$ and $A^4$ and series-type field magnet windings $F^1$, $F^2$, $F^3$ and $F^4$; an auxiliary motor-generator set comprising an armature M, a series field winding MF therefor, a second armature winding G that is mechanically associated with the armature M in any suitable manner, and a shunt field winding GF for the armature winding G; a resistor $R^1$ that is disposed in series-circuit relation with the field winding MF; a second resistor $R^2$ that is connected in circuit with the field winding GF across the armature winding G; and a suitable switching device or controller C, that is conventionally illustrated here, for the purpose of suitably governing the general operation of the system.

All of the main dynamo-electric machine armatures $A^1$ to $A^4$, inclusive, are connected in parallel-circuit relation between the supply-circuit conductors Trolley and Ground, while the main field windings $F^1$ to $F^4$, inclusive, are connected in series-circuit relation with the resistor $R^1$, the field winding MF and the armature winding M across the supply circuit. The armature winding G is connected directly to the supply-circuit conductors.

By the use of the connections illustrated, approximately one quarter of the total regenerated current traverses the exciting circuit of the main field windings. However, such a value of current requires a voltage that is materially lower than that available and, consequently, if plain rheostatic control were employed in the exciting circuit, relatively heavy losses would occur. By connecting the armature winding M in circuit in such manner that it acts as a bucker, that is to say, so that its voltage opposes the voltage of the regenerating machines and assists the voltage of the supply circuit, the exciting current for the regenerating machines is reduced to a suitable value without entailing any heavy losses, inasmuch as all of the surplus exciting energy that is not necessary to overcome the relatively small mechanical and electrical losses of the motor-generator set is returned to the supply circuit by the armature winding G, whereby a relatively efficient and economical system of regenerative control is obtained.

It will be understood that regulation of the regenerative operation may be effected by suitable manipulation of the resistors $R^1$ and $R^2$ during the period that the speeds of the main dynamo-electric machines are gradually decreasing, or in any other suitable manner.

Reference may now be had to Fig. 2, wherein the only difference from the system shown in Fig. 1 resides in the connection of the armature winding G between the negative supply-circuit conductor, Ground, and a point intermediate the armature winding M and the field windings of the main dynamo-electric machines, while the armature winding M is provided with a shunt field winding $MF^1$ that is connected through a variable resistor $R^3$ across the armature winding.

In this way, the surplus exciting energy that is transmitted from the armature M to the armature G is returned to the exciting circuit comprising the main field windings, whereby a motor-generator set of still smaller capacity than is necessary in the system shown in Fig. 1 may be employed.

In Fig. 3, the armatures and field windings of the main dynamo-electric machines are connected in the manner already described, and a dynamotor is employed in place of the motor-generator set mentioned above for the purpose of regulating the excitation current for the main machine.

The dynamotor shown comprises mechanically-connected armature windings $M^1$ and $G^1$ and a common field-magnet winding DF that is connected across the armature winding $G^1$. A resistor $R^4$, the sections of which may be respectively short-circuited by switches 1 and 2, is connected between the armature winding $G^1$ and the negative supply-circuit conductor, Ground.

The armature winding $M^1$ is connected in series-circuit relation with the main field windings $F^1$ to $F^4$, inclusive, across the supply circuit, while the armature winding $G^1$ is adapted to return the surplus exciting-circuit energy to the supply circuit, in a manner similar to that described in connection with Fig. 1, and no further description thereof is believed to be necessary.

In Fig. 4 the dynamotor connections are modified in the following manner: the armature windings $M^1$ and $G^1$ are disposed in series-circuit relation with a variable resistor $R^5$ across the supply circuit, while the dynamotor field winding DF is connected across the two series-connected armature windings $M^1$ and $G^1$.

The armature winding $G^1$ is thus adapted to return the surplus exciting-circuit energy to the main field windings $F^1$ to $F^4$, inclusive, in the manner already set forth in connection with Fig. 2. In this case, the dynamotor may be of smaller capacity than that necessary for operation in connection with the system shown in Fig. 3.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a plurality of main momentum-driven dynamo-electric machines severally having armatures and field magnet windings, of means for connecting said armatures in parallel-circuit relation, means for connecting said field windings in series-circuit relation, a plurality of mechanically associated auxiliary armature windings, means for connecting one of said auxiliary windings in series-circuit relation with said field windings to act as a bucker, and means for connecting said second armature winding to return the energy derived from said bucker to certain circuits.

2. In a system of control, the combination with a supply circuit and a plurality of main momentum-driven dynamo-electric machines severally having armatures and field-magnet windings, of means for connecting said armatures in parallel-circuit relation across said supply circuit, means for connecting said field windings in series-circuit relation, a plurality of mechanically-associated armature windings, means for connecting one of said auxiliary windings in series-circuit relation with said field windings across the supply circuit to act as a bucker and employ the energy not needed for field excitation, and means for connecting said second armature winding to return the energy derived from said bucker to the supply circuit.

3. In a system of control, the combination with a supply circuit and a plurality of main momentum-driven dynamo-electric machines severally having armatures and field-magnet windings, of means for connecting said armatures in parallel-circuit relation across said supply circuit, means for connecting said field windings in series-circuit relation, a plurality of mechanically associated armature windings, means for connecting one of said auxiliary windings in series-circuit relation with said field windings across the supply circuit to act as a bucker and to employ the energy not needed for field excitation, and means for connecting said second armature winding across the series-connected field windings to return the energy derived from said bucker thereto.

In testimony whereof, I have hereunto subscribed my name this 31st day of Aug., 1915.

RUDOLF E. HELLMUND.